J. L. CREVELING.
ELECTRIC REGULATION.
APPLICATION FILED AUG. 17, 1916. RENEWED NOV. 22, 1921.
1,404,933.
Patented Jan. 31, 1922.
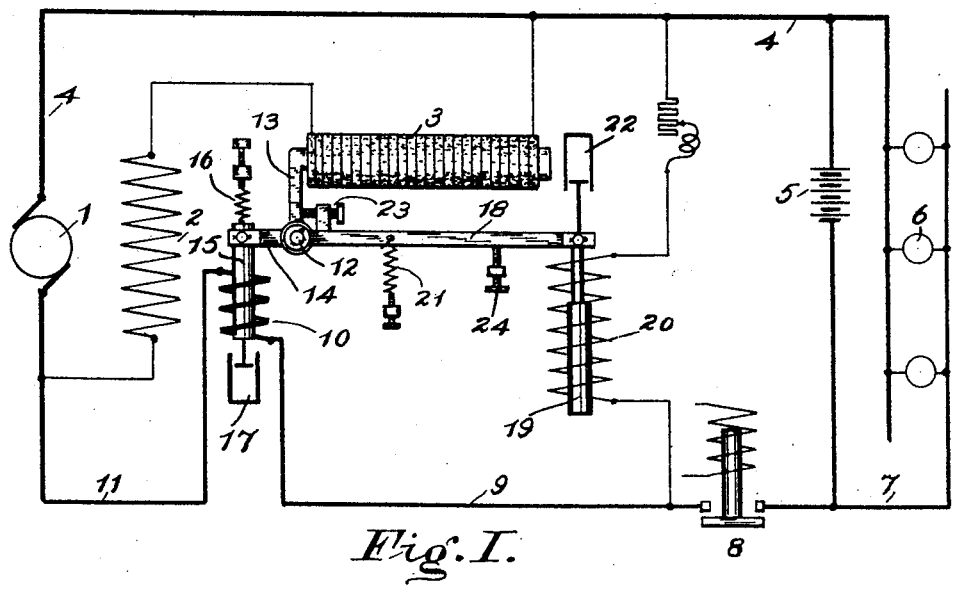
Fig. I.
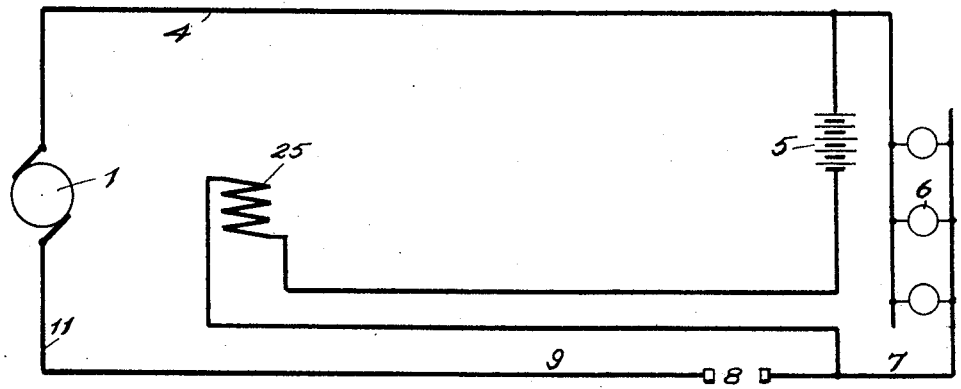
Fig. II.
INVENTOR
John L. Creveling

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

1,404,933. Specification of Letters Patent. Patented Jan. 31, 1922.

Application filed August 17, 1916, Serial No. 115,421. Renewed November 22, 1921. Serial No. 517,155.

*To all whom it may concern:*

Be it known that I, JOHN L. CREVELING, a citizen of the United States, residing in White Plains, county of Westchester, and State of New York, have invented certain new and useful Improvements in Electric Regulation, of which the following is a description.

My invention pertains to that class of electric regulation wherein it is desired to regulate a controllable source of electrical potential difference and has for a particular object to provide means whereby said source may be automatically regulated in a predetermined manner. A further object of my invention is to provide means whereby the current in a circuit supplied from said source may be held within predetermined limits and means whereby the voltage across a circuit supplied by said source may also be held from exceeding a predetermined limit. As such systems of regulation are particularly useful for regulating a dynamo operating to charge a storage battery and maintain lamps or other translating devices and more especially when the dynamo is driven at variable speeds causing its voltage and consequent current output to tend to widely vary, my invention will be described with particular reference to such a system.

In the drawing, Fig. I. is a diagrammatic representation of one type of system embodying the essentials of my invention.

Fig. II. shows a portion of a system similar to that of Fig. I. in which a modification is shown without departing from my invention.

In the drawing, 1 represents a dynamo or generator provided with the usual field coil 2, having in series therewith a regulating device or element, in this instance indicated as a carbon pile 3, and it will be obvious that the dynamo may be regulated by regulating the pressure upon the said element 3 in a well known manner. 4 represents the positive lead of the dynamo which is in electrical communication with the positive side of the storage battery 5 and the positive terminals of lamps or other translating devices indicated at 6. The negative terminals of the translating devices 6 and the battery 5 are in communication with the lead 7 carried to one side of any suitable automatic switch indicated at 8. This switch, the mere presence of which is indicated in the drawing for the sake of clearness, is preferably one of the well-known automatic variety adapted to close its circuit when the generator voltage is substantially equal to or slightly in excess of that of the storage battery and to open the circuit when the generator voltage falls very slightly below that of the storage battery in such manner as to prevent back discharge from the battery through the generator.

The opposite terminal of switch 8 is connected as by the lead 9 with one end of the series coil or solenoid 10, the opposite end of which is connected as by lead 11 with the negative brush of the generator 1. The pivot 12 carries a bell crank lever having the branches 13 and 14 which are in fixed relation with regard to each other and rotatable about the said pivot, preferably with negligible friction. The branch 13 presses upon one end of the carbon pile 3, the opposite end of which is stationary, and manipulation of the said branch 13 will, therefore, regulate the generator by controlling the excitation of the field coil 2. The arm 14 carries the core 15 of iron or other magnetic material normally drawn in an upward direction by the adjustable spring 16 which tends to compress the pile 3 and lower the resistance thereof. The coil 10 when excited tends to draw the core 15 downwardly against the action of spring 16 so as to increase the resistance of the pile 3; while too sudden movement of the core is resisted by the dashpot arrangement indicated at 17. 18 is a long arm preferably several times the length of the arm 14, rotatably carried by the pivot 12, and carries at its outward extremity a core 19 surrounded by a fine coil 20 in shunt across the generator leads and which when excited tends to lift the core 19 and lever 18 against the action of adjustable spring 21 and dashpot 22 so as to swing the adjustable screw 23 into contact with the lever 13 and decrease the pressure upon pile 3 and increase the resistance thereof. 24 is an adjustable stop limiting the downward movement of the lever 18.

In Fig. II. like numerals are used to indicate like parts and the coil 25 is shown in series with the battery 5. In the system of Fig. I., if the coil 10 be suppressed and the coil 25 of Fig. II. substituted in its stead, the core 15 will be affected by the current in the battery circuit only instead of the total generator output.

An operation of my invention is substantially as follows:

If the dynamo be at rest or running at low speed, the switch 8 will be open and translating devices 6 may be maintained by the battery 5 in a well known manner. If the generator have its voltage raised until in excess of that of the battery, the switch 8 will close and current will flow from the generator 1 through lead 4, battery 5 and translating devices 6 to lead 7, switch 8, then through lead 9, coil 10 and lead 11 to the generator. Current will also flow through coil 20 which is shown in shunt across the generator and having in series therewith a variable resistance for the purpose of adjustment. This current will tend to raise the core 19 and lever 18 against the action of adjustable spring 21 and dashpot 22 in such manner as to bring the adjustable screw 23 into contact with lever 13, when further movement of the lever 18 will cause the pressure upon the pile 3 to be decreased. And I so adjust the spring 21 and the variable resistance in series with the coil 20 that when the generator voltage reaches a predetermined maximum which it is desired shall not be exceeded in value, further rise in voltage will be prevented by the coil 20 lifting the core 19 and swinging the lever 18 so as to decrease the pressure upon the pile 3 and cut down the field excitation to prevent this maximum voltage from being exceeded. By using a comparatively long-pull solenoid 20 of fairly liberal dimensions and a long lever 18, I may cause the voltage to be held constant within quite narrow limits throughout a wide tendency of the generator to exceed the maximum voltage. If the generator at or below this maximum voltage tend to deliver a current above a predetermined maximum such, for example, as might be dangerous with respect to the generator or the battery, (as is often the case when the battery is in a low state of charge) this high current value in the coil 10 will cause the same to draw the core 15 downwardly and relieve the pressure upon the pile 3 in such manner as to prevent this maximum current from being exceeded, that is, within reasonable limits.

If the system be thus operating with a high current value in the coil 10 and the said coil having, therefore, a considerable effect upon the pile 3 and this current cause the battery voltage to rise until the rise in voltage across the coil 20 causes it to assume the principal part in regulating the generator, it will usurp the function of the coil 10 and the current in the coil 10 will gradually taper off as the voltage of the battery rises, and a comparatively small change in voltage may cause a considerable change in the current of the coil 10. However, as above mentioned, the voltage regulating coil 20 and its cooperating parts are capable of regulating the generator within quite narrow limits, while the coil 10 and its cooperating parts provide only what might be called comparatively coarse regulation and, therefore, I can make the lever 14 so short that ordinary fluctuations such as occur in the current delivered by the generator while the current is below the maximum desired value and the coil 20 is regulating the generator, have little or no appreciable effect upon the pile 3 which remains at all such times sensitive to very delicate alterations in voltage across the coil 20 notwithstanding the core 15 and the lever 13 directly affecting the pile 3 are always mechanically connected.

An operation of that modification brought out in Fig. II. is the same as that outlined above with regards Fig. I. with the exception that current in the battery circuit is held from exceeding a predetermined limit through the instrumentality of coil 25 acting upon core 15 instead of the total generator current as in the system of Fig. I.

I do not wish in any way to limit myself to any of the exact details of construction or modes of operation set forth above merely to portray an embodiment of my invention for it is obvious that wide departure both in construction and in operation may be made without departing from the spirit and scope of my invention which is as set forth in the following claims:

1. The combination with a dynamo, storage battery charged thereby, and a regulating element affecting the operation of the dynamo, of means for affecting said regulating element comprehending a relatively weak current responsive means affected by the operation of the dynamo, a relatively powerful voltage responsive means affected by the operation of the dynamo and means whereby said voltage responsive means may affect the current responsive means and so dominate the effect of current fluctuations in the current responsive means that substantially pure voltage regulation supersedes current regulation upon a rise in voltage above a predetermined standard.

2. Regulating means comprehending current responsive means, voltage responsive means, and means operated thereby affected in functionally different degrees by like mechanical efforts applied thereto by said responsive means including separately movable power increasing means through which the voltage responsive means engages and disengages said operated means.

3. Regulating means comprehending current responsive means, voltage responsive means, regulating means operated thereby affected in functionally different regulating degrees by equal fluctuations in mechanical efforts of the responsive means comprising power increasing means operated by the voltage responsive means and means whereby said power increasing means engages and disengages the current responsive means.

4. Means for regulating a generator to hold its current substantially constant when the same reaches a predetermined value and to hold its voltage substantially constant when the same reaches a predetermined value comprehending a regulating element, movable means for affecting the same, current responsive means connected with said movable means, voltage responsive means and engaging means operated thereby for engaging the movable means to affect the same in response to voltage fluctuations, the arrangement of the movable means and the responsive means being such that small mechanical efforts on the part of the voltage responsive means, when above a certain value, so dominate the effect of equal efforts on the part of the current responsive means that the regulation in response to such voltage fluctuations is substantially unaffected by the current fluctuations caused by the effect of the operation of the voltage responsive means.

5. Means for regulating a generator comprehending a regulating element, movable means for affecting the same, current responsive means permanently connected with said movable means, voltage responsive means and means operated thereby for engaging the movable means upon rise in voltage above a predetermined standard and capable of disengaging the same to render voltage fluctuations ineffective when said fluctuations cause the voltage value to fall below a predetermined limit, the arrangement of the movable means and the responsive means being such that small mechanical efforts on the part of the voltage responsive means, when above a certain predetermined value, so dominate the effect of equal efforts on the part of the current responsive means that the regulation in response to such voltage fluctuations is substantially unaffected by the current fluctuations incident to the effect of the operation of the voltage responsive means.

6. The combination with a generator, of a regulating element affecting the operation thereof, lever mechanism for affecting said element, current responsive means connected with said lever mechanism, voltage responsive means connected with said lever mechanism at a point of functionally greater leverage than the current responsive means said lever mechanism including means whereby the voltage responsive means may operate the lever mechanism to affect the operation of the generator and to substantially usurp the entire regulation of the generator when its voltage reaches a predetermined value.

7. The combination with a dynamo, of means for regulating the same comprehending a regulating device, movable means for affecting said device, current responsive means connected with said movable means, voltage responsive means of relatively greater power than the current responsive means, means for operatively connecting the same with and disconnecting the same from the movable means, the arrangement of the responsive means and the movable means being such that relatively large fluctuations in current are required to affect the regulating device and comparatively small fluctuations in voltage affect the same to regulate the generator when above a predetermined value.

8. The combination with a dynamo, of means for regulating the same comprehending a regulating device, movable means for affecting said device, current responsive means connected with said movable means, voltage responsive means of relatively greater power than the current responsive means, means for operatively uniting the same with the movable means when the voltage reaches a predetermined value, the arrangement of the responsive means and the movable means being such that relatively large fluctuations in current are required to affect the regulating device and comparatively small fluctuations in voltage affect the same to regulate the generator when above a predetermined value with relatively immaterial modification by relatively large changes in current in the current responsive means caused by the action of the voltage responsive means in regulating the dynamo.

9. Means for regulating a dynamo comprehending a regulating device, movable means for affecting the same, current responsive means tending upon all fluctuations in current therein to affect the movable means, mechanically independent voltage responsive movable means and means operated thereby for engaging the movable means, the arrangement of said movable means and the responsive means being such that small mechanical movements in the portion of the movable means affected by the current responsive means are caused by large mechanical movements in that portion of the movable means affected by the voltage responsive means, and the arrangement of the engaging means being such as to connect the voltage responsive means with the movable means when the voltage tends to exceed a predetermined value.

10. The combination with a generator and battery charged thereby, of a regulating device affecting the electrical operation of the generator, lever mechanism for controlling said device, current responsive means connected with said lever mechanism and tending to prevent the current supplied to the battery from exceeding a predetermined limit, means connected with said lever mechanism at a point of greater leverage than the current responsive means and voltage responsive means cooperating with said means to affect the operation of the generator and tending to prevent the voltage impressed upon the battery from exceeding a predetermined limit, the difference in operative leverage between the connections of the current responsive means and the voltage responsive means being of such order of magnitude that the falling off in current to the battery when the same reaches a certain voltage produces substantially immaterial effect upon the voltage held across the battery by the voltage responsive means.

11. The combination with a dynamo and battery charged thereby, of means for regulating the dynamo comprehending a device controlling the electrical operation thereof, movable means for affecting said device, current responsive means affected by current supplied by the dynamo to the battery and so arranged with respect to said movable means that fluctuations in current measured thereby always tend to affect said movable means, voltage responsive means affected by voltage fluctuations across the battery and ineffectively energized when said voltage is below a predetermined value and effectively energized when the voltage exceeds this value to affect the movable means and so arranged with respect to said means that a materially lesser mechanical effort through a greater distance produces the effect upon the said device that a materially greater mechanical effort through a lesser distance on the part of the current responsive means produces, said arrangement comprehending means whereby the voltage responsive means may engage the movable means in any position placed by the current responsive means and whereby further movement caused by the voltage responsive means operates the regulating device to regulate the dynamo.

12. The combination with a variable speed dynamo, a storage battery charged thereby, means for regulating the dynamo to compensate for speed changes comprising a regulating device, and current responsive means affected by generator current for operating said device and at all times tending to affect the same upon current changes, of voltage responsive means normally ineffective during charging of the battery till its voltage reaches a desired maximum, means whereby said voltage responsive means affects the regulating device when said desired voltage value is reached by the generator, the arrangement of said voltage responsive means and its connection with the regulating device being such that the voltage responsive means predominates in the regulation of the dynamo when affecting the same, due to slight voltage changes then having greater effect upon the regulating device than relatively large current changes have during the operation of the voltage responsive means.

13. Regulating means comprehending current responsive means capable of operating the same, upon any movement thereof normally ineffective voltage responsive means and means whereby the voltage responsive means may affect the current responsive means in such greater degree upon fluctuations in magneto-motive force than the current responsive means is affected by equivalent fluctuations that the voltage responsive means usurps substantially the entire regulating function when affecting the current responsive means.

14. Regulating means comprehending current responsive means, voltage responsive means and means operated thereby affected independently by any motion of the current responsive means and in such magnified degree by the voltage responsive means upon equivalent fluctuations in mechanical efforts of the responsive means that the voltage responsive means usurps substantially the entire regulating function when affecting the current responsive means and causes regulation for substantially constant voltage.

15. Regulating means comprehending a regulating element, a movable element for controlling the same, current responsive means connected with said movable element, voltage responsive means, a movable element operated thereby affected in greater degree in response to equivalent fluctuations in magnetomotive force than the current responsive means including a power, a multiplying element and means whereby the same engages the first named movable element to perform substantially the total effective regulating function during certain stages of operation in response to voltage fluctuations above a predetermined standard.

16. Regulating means comprehending a regulating element, mechanical means for affecting said element, current responsive means permanently connected with said mechanical means and affecting said element in response to current fluctuations, voltage responsive means, power increasing means operated thereby and means whereby said last named means operates the mechanical means under predetermined conditions to affect the regulating element in such degree that current fluctuations in the current responsive means cause negligible effect upon the regulator while responding to voltage fluctuations.

17. Means for regulating a generator comprehending a regulating element, current responsive means affected by the operation of said generator, a movable member for affecting the regulating element operated by and permanently connected with the current responsive means, voltage responsive means, a lever operated thereby and provided with means for engaging and affecting the movable means and so increasing the power of the voltage responsive means that while the voltage responsive means is operative, it regulates the generator for substantially constant voltage and the current responsive means is substantially inoperative to affect the generator.

18. Means for regulating a generator comprehending a regulating element, movable means for controlling said element, current responsive means affecting said movable means in response to fluctuations in current derived from said generator, voltage responsive means, a member moved thereby for affecting the movable means and which produces lesser travel of said movable means to increase the delicacy of operation of the voltage responsive means to such extent that when the voltage responsive means affects the regulating element it regulates the generator in response to voltage fluctuation and causes the current in the current responsive means to decrease, and such decrease in current is prevented from appreciably affecting the regulation of the generator.

19. Regulating means comprehending a regulating element, lever mechanism cooperating therewith, current responsive means for affecting said lever mechanism, voltage responsive means, a multiplying lever operated thereby and means for engaging the first named lever mechanism whereby the regulating effects produced in response to voltage fluctuations above a certain standard are so great with respect to the effects produced by the current fluctuations corresponding to said voltage fluctuations that the effect upon the regulating element in response to said current fluctuations is substantially negligible and the generator is regulated in response to voltage fluctuations to maintain substantially constant voltage.

20. Regulating means comprehending a regulating element, rotatable means for affecting said element, current responsive means affecting said rotatable means, independently rotatable means having the same center of rotation as the first named rotatable means, voltage responsive means for operating the last named rotatable means and means whereby said last named rotatable means engages the first named rotatable means under predetermined conditions of the voltage responsive means, the arrangement of the rotatable means being such that fluctuations in current in the current responsive means produce lesser effects upon the regulating means than the fluctuations in voltage causing the same have upon the voltage responsive means whereby voltage regulation is caused to supersede current regulation during certain stages of operation.

JOHN L. CREVELING.

Certificate of Correction.

It is hereby certified that in Letters Patent No. 1,404,933, granted January 31, 1922, upon the application of John L. Creveling, of White Plains, New York, for an improvement in "Electric Regulation," an error appears in the printed specification requiring correction as follows: Page 4, line 111, claim 15, after the word "power" strike out the comma and the article "a"; and that the said Letters Patent should be read with this correction therein that the same may conform to the record of the case in the Patent Office.

Signed and sealed this 4th day of April, A. D., 1922.

[SEAL.]
KARL FENNING,
*Acting Commissioner of Patents.*